(12) United States Patent
Amann

(10) Patent No.: US 10,945,821 B2
(45) Date of Patent: Mar. 16, 2021

(54) SINTERED BLANK FOR PRODUCING A DENTAL PROSTHESIS

(71) Applicant: Amann Girrbach AG, Koblach (AT)

(72) Inventor: Oliver Amann, Altach (AT)

(73) Assignee: Amann Girrbach AG, Koblach (AT)

( * ) Notice: Subject to any disclaimer, the term of this patent is extended or adjusted under 35 U.S.C. 154(b) by 260 days.

(21) Appl. No.: 15/749,629

(22) PCT Filed: Jun. 20, 2016

(86) PCT No.: PCT/EP2016/064150
§ 371 (c)(1),
(2) Date: Feb. 1, 2018

(87) PCT Pub. No.: WO2017/021051
PCT Pub. Date: Feb. 9, 2017

(65) Prior Publication Data
US 2019/0175316 A1    Jun. 13, 2019

(30) Foreign Application Priority Data

Aug. 3, 2015   (EP) ..................................... 15002303

(51) Int. Cl.
*A61C 13/00* (2006.01)
*B33Y 10/00* (2015.01)
(Continued)

(52) U.S. Cl.
CPC ...... *A61C 13/0022* (2013.01); *A61C 13/0004* (2013.01); *B28B 1/001* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| | | |
|---|---|---|
| 3,797,993 A | 3/1974 | Heldt et al. |
| 3,904,352 A | 9/1975 | Thurnauer et al. |

(Continued)

FOREIGN PATENT DOCUMENTS

| | | |
|---|---|---|
| CN | 101715325 | 5/2010 |
| CN | 103347463 | 10/2013 |

(Continued)

OTHER PUBLICATIONS

Sintering Instructions for Long-Span Bridges, Framework Management Manual, Amann Girrbach, Aug. 14, 2012.
(Continued)

Primary Examiner — David Sample
Assistant Examiner — Elizabeth Collister
(74) *Attorney, Agent, or Firm* — Volpe Koenig

(57) ABSTRACT

A sintered blank (1) for producing a dental prosthesis is provided, in which the sintered blank (1) include at least one product area (2), from which the dental prosthesis is produced, and at least one auxiliary sintering body (3) and connecting webs (4) for bracing the product area (2), wherein the auxiliary sintering body (3) is connected to the product area (2) by the connecting webs (4), the auxiliary sintering body (3) including one, preferably precisely one, at least in some areas, preferably completely curved support surface (5).

16 Claims, 5 Drawing Sheets

(51) Int. Cl.
*B33Y 80/00* (2015.01)
*B28B 1/00* (2006.01)

(56) References Cited

U.S. PATENT DOCUMENTS

| | | |
|---|---|---|
| 3,953,197 A | 4/1976 | Geck et al. |
| 4,380,463 A | 4/1983 | Matesa |
| 4,769,058 A | 9/1988 | McMaster |
| 5,106,303 A | 4/1992 | Oden et al. |
| 5,417,399 A | 5/1995 | Saito et al. |
| 5,447,967 A | 9/1995 | Tyszblat |
| 5,634,956 A | 6/1997 | Suh et al. |
| 5,738,702 A | 4/1998 | Ruppert et al. |
| 6,106,747 A | 8/2000 | Wohlwend |
| 6,287,433 B1 | 9/2001 | Sapozhnikova |
| 6,352,669 B1 | 3/2002 | Cooper et al. |
| 2006/0082033 A1 | 4/2006 | Hauptmann et al. |
| 2006/0131770 A1 | 6/2006 | Dierkes et al. |
| 2010/0015570 A1 | 1/2010 | Kutzner et al. |
| 2010/0291509 A1* | 11/2010 | Berggren ............... A61C 13/12 433/199.1 |
| 2010/0323327 A1 | 12/2010 | Eriksson et al. |
| 2014/0113428 A1 | 4/2014 | Johannson et al. |

FOREIGN PATENT DOCUMENTS

| | | |
|---|---|---|
| DE | 19904523 | 8/2000 |
| DE | 202014010392 | 7/2015 |
| EP | 05430370 | 3/1993 |
| EP | 0583620 | 5/1997 |
| EP | 2147904 | 1/2010 |
| EP | 1154969 | 6/2011 |
| JP | S56160380 | 12/1981 |
| JP | H01308879 | 12/1989 |
| JP | H0274567 | 3/1990 |
| JP | H05162108 | 6/1993 |
| JP | H08253366 | 10/1996 |
| JP | 2006163370 | 6/2006 |
| WO | 9629951 | 10/1996 |
| WO | 2008148495 | 12/2008 |

OTHER PUBLICATIONS

Instruction Sheet for Milling Frameworks with an Anatomical Length of more than 50 mm, Amann Girrbach, 7, pages, Dec. 2007.

* cited by examiner

SINTERED BLANK FOR PRODUCING A DENTAL PROSTHESIS

BACKGROUND

The present invention relates to a sintering blank for producing a dental prosthesis, wherein the sintering blank has at least one product region, from which the dental prosthesis is created, and at least one sintering auxiliary body and connecting webs for bracing the product region, wherein the sintering auxiliary body is connected to the product region by the connecting webs.

For the purposes of producing a dental prosthesis, the prior art has disclosed the forming processing of sintering blanks in the unsintered or partly sintered state so as, then, to produce the dental prosthesis by sintering or completing the sintering of the sintering blank prepared in this manner. Compared to processing completely sintered material, this is advantageous in that the material is significantly softer, and hence easier to process, prior to sintering or in the partly sintered state. However, it should be noted in this context that certain shrinkage of the sintering blank during sintering cannot be avoided. In particular, sintering blanks temporarily become very soft during the sintering process at the, after all, very high temperatures and hence become susceptible to unwanted deformations.

EP 1 154 969 B2 proposes, inter alia, a method for dimensionally accurate sintering of ceramic formed articles, in which the product region of the sintering blank, from which the dental prosthesis is intended to arise, is connected by connecting webs to a sintering auxiliary body, denoted a carrier in EP 1 154 969 B2, wherein this sintering auxiliary body has a plane, i.e. flat, surface, by which it stands on a pourable powder bed. This structure, shown in EP 1 154 969 B2: FIG. 8, is disadvantageous in that the product region from which the dental prosthesis should arise is only supported by the connecting webs, as a result of which there may be, by all means, an unwanted deformation of the sintering blank during the sintering due to gravity.

U.S. Pat. No. 3,904,352 A proposes that bodies to be sintered be supported on heat resistant spheres during the sintering so that there are no deformations during the shrinkage process. EP 0 583 620 A1 has disclosed the practice of embedding the article to be sintered into a bed made of a ceramic component during the sintering process.

SUMMARY

It is an object of the invention to improve a sintering blank of the aforementioned type to the extent that it can be positioned as easily as possible in a pourable bed made of carrier beads or a carrier powder for the subsequent sintering process.

According to the invention, this is achieved by virtue of the sintering auxiliary body having one, preferably precisely one, support surface that is arched at least in regions, preferably everywhere.

As a result of the arched support surface on the sintering auxiliary body, the sintering blank can be pre-positioned very easily and with little outlay in a pourable bed made of carrier beads and/or a carrier powder prior to the sintering process. To this end and due to the arched support surface, there is no need for a special preparation of the pourable bed or its surface topography before the insertion or placement of the sintering blank. By way of the arched support surface of the sintering auxiliary body, the sintering blank can be placed onto, or slightly pressed into, the bed together with the product region with little outlay and, in particular, with very little application of force. As a result of the arched support surface, the sintering auxiliary body causes very little displacement of carrier beads or carrier powder during this process. As a result of the fact that little force needs to be applied, there is also a reduction of the risk that the sintering blank inadvertently deforms during this process. The sintering blank according to the invention can be placed onto a relatively flat surface of the pourable bed. The risk of the formation of unstable gradients within the pourable bed, which could result in insufficient support of the sintering blank during the sintering process, is significantly reduced or overcome. During the sintering process itself, very low friction between the sintering auxiliary body and the pourable bed is ensured as a result of the arched support surface of the sintering auxiliary body, which in turn is expedient for a distortion-free shrinkage of the sintering blank during the sintering process.

Moreover, a better accessibility to the connecting webs can also be provided by the arched support surface of the sintering auxiliary body; this simplifies the separation of the connecting webs from the product region following the sintering process.

As a result of the arched embodiment of the support surface of the sintering auxiliary body, it is also possible to form the sintering auxiliary body to be relatively small or flat and, in comparison with the product region, have a comparatively large volume, as result of which the risk of thermal stresses during heating and cooling of the sintering blank is reduced. Furthermore, the measure according to the invention also allows an idealized transition between the sintering auxiliary body and the connecting webs to be obtained in order thus to avoid connection fractures during the sintering process as a consequence of thermal stresses resulting from volume differences that are too large in the respective transition region.

The sintering blank could also be referred to as a green body. In any case, this is an article which only cures completely by way of the subsequent sintering process. The sintering blank may be completely unsintered or else partly sintered or the sintering process may have only just started. The product region of the sintering blank is the component from which the dental prosthesis arises by way of the sintering process and post-processing steps, which may be required. The sintering auxiliary body and the connecting webs are an auxiliary structure or bracing which is intended to prevent a distortion of the sintering blank and, in particular, of the product region during the sintering process. This auxiliary structure, i.e. the composite of sintering auxiliary body and connecting webs, should be removed after the sintering process. Expediently, this is carried out by separating the connecting webs from the product region. The sintering auxiliary body is preferably connected to the product region by the connecting webs only.

The arched support surface of the sintering auxiliary body serves for bearing purposes on a pourable bed during the sintering process. Expediently, the arching of the support surface is embodied, in particular, in the edge regions of the sintering auxiliary body. Expediently, the arched support surface is a single arched region. Thus, the sintering auxiliary body expediently has exactly one arched support surface. It preferably extends over the entire lower side of the sintering auxiliary body facing the pourable bed during the sintering process. However, the arched support surface may also have flat or more or less planar portions in the central region of the sintering auxiliary body in particular, without this necessarily impairing the function. The arching of the arched support surface is expediently formed without edges and corners in any case. Preferably, provision is made for the sintering auxiliary body, at least in its region delimited by the arched support surface, to have at least one convex cross section. Preferably, the cross section is completely convex. Particularly preferably, the entire sintering auxiliary body has a corresponding convex cross section. In particularly preferred variants of the invention, provision is made for the sintering auxiliary body, at least in its region delimited by the arched support surface and preferably the entire sintering auxiliary body, to have convex cross sections, preferably completely convex cross sections, in at least two mutually orthogonal spatial directions.

Preferably, the sintered auxiliary body has a greater thickness in its central region than in its regions at the edge, preferably than in all regions at the edge. Expediently, the connecting webs only merge into the sintering auxiliary body in the regions at the edge. Preferably, the maximum thickness of the sintering auxiliary body is less than or equal to 6 times, preferably less than or equal to 4 times, the minimum thickness of the connecting webs. Here, all aforementioned thicknesses are expediently measured parallel to one another, particularly preferably in a manner normal to the occlusion plane formed by the product region.

In preferred variants, the sintering auxiliary body, at least in its region delimited by the arched support surface, has at least one convex lens-shaped cross section. In particularly preferred embodiments, this applies, once again, to cross sections in at least two mutually orthogonal spatial directions. Particularly preferably, this applies to the entire sintering auxiliary body.

Expediently, the product region is a dental arch with a sequence of a plurality of denture tooth blanks connected to one another. Here, the sintering auxiliary body expediently connects at least two of the denture tooth blanks of this dental arch by way of the connecting web in each case. The denture tooth blanks of the sequence are preferably connected to one another in pairs in each case. What this means is that each denture tooth blank is connected in each case to its adjacently arranged denture tooth blank(s). The product region may be a complete dental arch for the maxilla or mandible with correspondingly all denture tooth blanks required to this end. However, the dental arch also may be a partial prosthesis which does not necessarily comprise all denture tooth blanks required for the maxilla or mandible. The dental arch expediently imitates, in terms of its curvature, the natural profile of the teeth in the maxilla or mandible. In this context, reference could also be made, in a simplified manner, to a U-shaped or horseshoe-shaped profile of the dental arch. Expediently, the dental arch encloses an internal space in part or in regions and the sintering auxiliary body and/or the connecting webs is/are expediently arranged in this internal space, at least in part, preferably in full.

In principle, the sintering blank may be formed of any raw material that may be sintered and that is suitable for the production of dental prostheses. Thus, this may also relate to metallic material. However, a sintering blank according to the invention particularly preferably has ceramic material, preferably zirconium oxide. Particularly preferably, the sintering blank is formed entirely of such ceramic material, preferably zirconium oxide.

Expediently, the product region and the sintering auxiliary body and the connecting webs are formed of the same material and have an integral embodiment with one another. Expediently, the entire sintering blank is an integral body. Particularly preferably, the sintering blank is worked out of a single material block. As a result of embodying the sintering blank from a mono-material, the product region, the sintering auxiliary body and the connecting webs shrink to the same extent during the sintering process, and so this cannot result in a distortion of the sintering blank and, in particular, of the product region during sintering. Reference is made to the fact that if reference is made to a material this may also relate to a material mixture, preferably an inherently homogeneous material mixture.

In addition to the sintering blank, the invention also relates to a sintering arrangement having a pourable bed made of carrier beads and/or a carrier powder, wherein a sintering blank according to the invention is mounted on the bed, and both the product region and the arched support surface of the sintering auxiliary body lie on the bed and/or are embedded, preferably only in part, into the bed. As a result of both the product region and the arched support surface of the sintering auxiliary body being mounted, the weight of the product region and of the sintering auxiliary body is carried in each case by the bed lying directly therebelow. Consequently, the weight of the product region does not weigh on the sintering auxiliary body, and vice versa. This, too, is expedient for distortion-free sintering. Suitable carrier beads or a suitable carrier powder are known from the prior art. These are also referred to as sintering beads and sintering powder, respectively. In preferred embodiments, this relates to an inert ceramic material which does not impair the sintering blank during the sintering process and which does not adhere to the latter either. Reference is made to carrier beads for as long as the individual beads are still identifiable by eye. In the case of a finer grain size, reference is made to a carrier powder. The grains of the carrier powder or of the carrier beads preferably have a rounded embodiment. This may be a spherical form, although this need not be the case.

Additionally, the invention also relates to a sintering method, in which a sintering blank according to the invention is mounted on a pourable bed made of carrier beads and/or a carrier powder during the sintering, wherein both the product region and the arched support surface of the sintering auxiliary body lie on the bed and/or are embedded, preferably only in part, into the bed. What is stated above for the corresponding sintering arrangement applies to the sintering methods, in particular what relates to both the product region and the arched support surface of the sintering auxiliary body lying on the bed.

In preferred variants, sintering blanks according to the invention also are constructed digitally. In this context, the invention also relates to computer program for constructing a sintering blank according to the invention using a digital computing device. Preferably, the aforementioned features of the sintering blank are taken into account and implemented during the programming of such a computer program. The pure programming work is effectuated according to the prior art. Reference could also be made to a method according to the invention for constructing a sintering blank according to the invention, which is carried out by a computer program on a digital computing device.

On the basis of a sintering blank constructed by way of such a computer program, a method according to the invention for producing this sintering blanks provides for at least one data record to be produced by the digital computing device when constructing the sintering blank and for the sintering blank to be produced on the basis of this data record by at least one material-adding method and/or one material-ablating method, preferably a milling method. Suitable material-adding methods and material-ablating methods are known in the prior art, just like the digital actuation of appropriate devices for implementing these methods. By way of example, 3-D printers and the like can be used for the material-adding methods. Material-ablating methods can be carried out by milling and/or grinding devices.

BRIEF DESCRIPTION OF THE DRAWINGS

Further features and details of preferred embodiments of the invention are explained below on the basis of the description of the figures. In the figures.

DETAILED DESCRIPTION OF THE PREFERRED EMBODIMENTS

Figure 1:
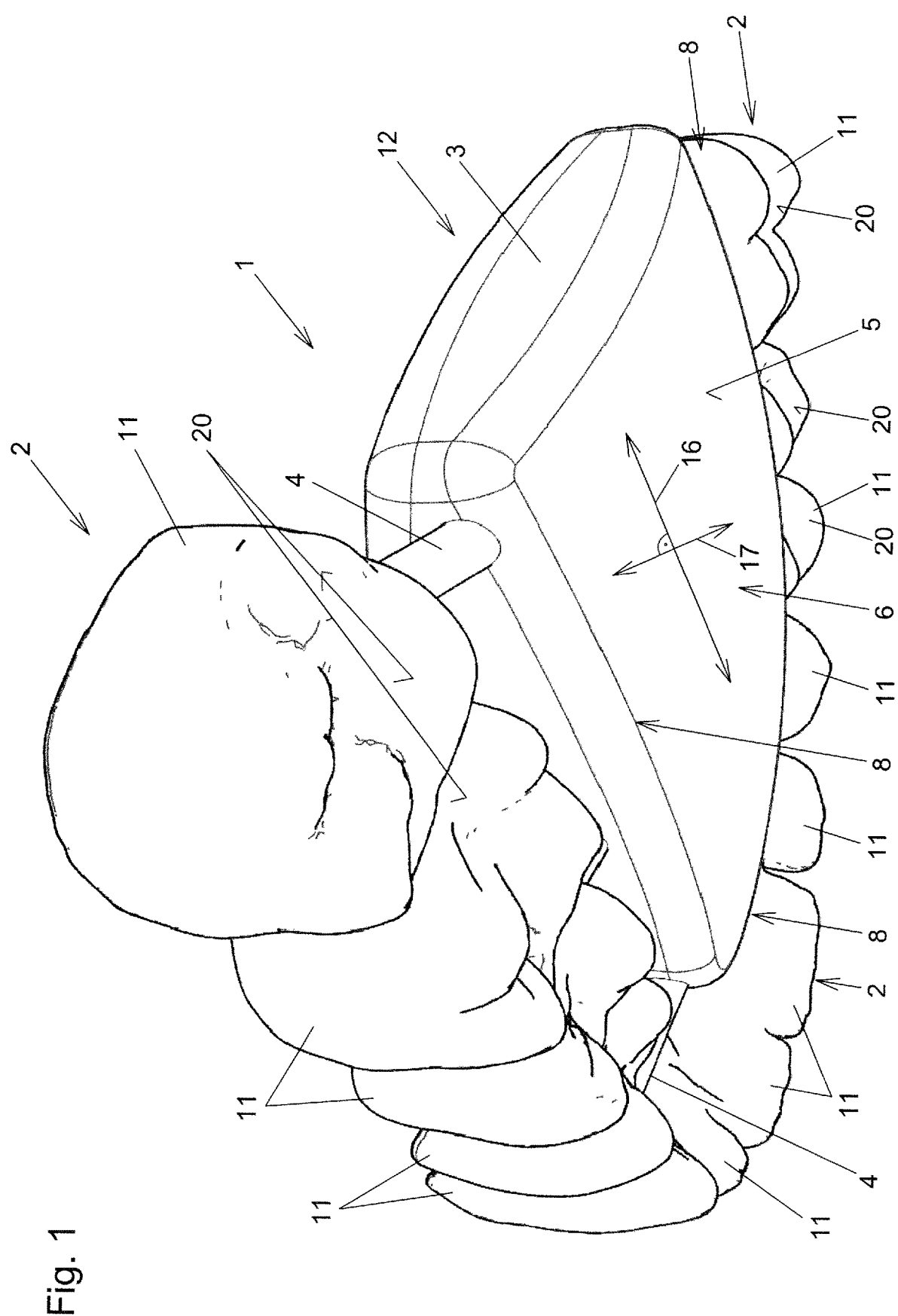
FIG. 1 shows a perspective view of a sintering blank according to the invention in perspective from below.

In an exemplary manner, FIG. 1 shows an embodiment according to the invention of a sintering blank 1 in perspective from below. This sintering blank has a product region 2 that is embodied in the form of a dental arch, having a sequence of denture tooth blanks 11. This dental arch made of denture tooth blanks 11 surrounds an internal space 12. Arranged therein are the sintering auxiliary body 3 and the connecting webs 4. By way of the connecting webs 4, the sintering auxiliary body 3 is connected to individual denture tooth blanks 11 of the product region 2.

The sintering auxiliary body 3 and the connecting webs 4 are a pure auxiliary structure which should prevent a distortion of the product region 2 during the sintering process. This auxiliary structure is particularly helpful if full prostheses such as, for example, whole dental arches or relatively large partial prostheses are intended to be produced by sintering. After the sintering or after completing the sintering, the auxiliary structure formed of the sintering auxiliary body 3 and the connecting webs 4 is separated from the product region.

The support surface 5, which is arched according to the invention, of the sintering auxiliary body 3 also can be identified easily. It is situated on the same side of the sintering blank 1 as the chewing surfaces 20 of the denture tooth blanks 11. As in other preferred embodiments as well, the sintering auxiliary body 3 has a single, i.e. precisely one, arched support surface 5. It extends over the whole side of the sintering auxiliary body 3 that points towards the pourable bed 13 during the sintering process. In the shown exemplary embodiment, the entire sintering auxiliary body 3 has completely convex cross sections in the two mutually orthogonal spatial directions 16 and 17. This applies, in particular, to the sintering auxiliary body 3, at least in its region delimited by the arched support surface 5. The surface 24 of the sintering auxiliary body 3 that lies opposite the arched support surface 5, which is not visible in FIG. 1 but plotted in FIG. 3, could also, if need be, have a different form without this impairing the advantages and technical effects, specified at the outset, of the support surface 5 with the arched embodiment of the sintering auxiliary body 3. In order to elucidate this in an exemplary manner, an alternative embodiment of the surface 24' that lies opposite the support surface 5 is plotted with dashed lines in FIG. 3. Unlike the surface 24, the surface 24' is not arched in a convex manner to the outside but in a concave manner to the inside, with this naturally only being one example of many.

Figure 2:
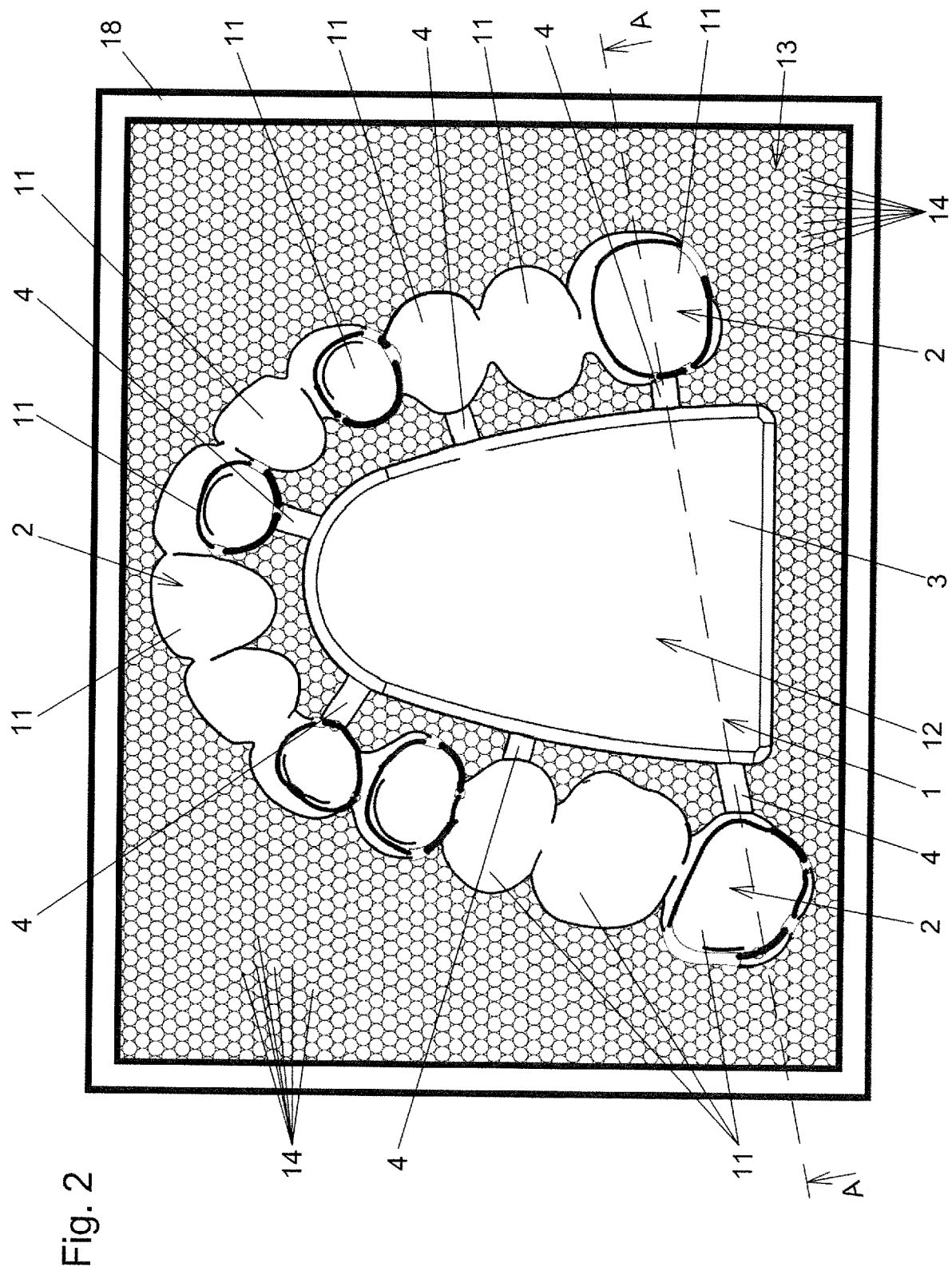
FIG. 2 shows a sintering arrangement according to the invention having this sintering blank.

FIG. 2 shows a plan view of the sintering arrangement according to the invention, in which the sintering blank 3 according to the invention is mounted on a pourable bed 13 made of carrier beads 14, with both the product region 2 and the arched support surface 5 of the sintering auxiliary body 3 lying on the bed 13 and/or being embedded into the bed 13, preferably only in part. In the shown exemplary embodiment, the pourable bed 13 is arranged in a sintering tray 18. The sintering beads 14 lie loosely against or on one another. In relation to the sintering blank 1, they have an inert behavior during the sintering process. This means that they neither adhere to the sintering blank 1 nor impair the latter in any other way.

Figure 3:
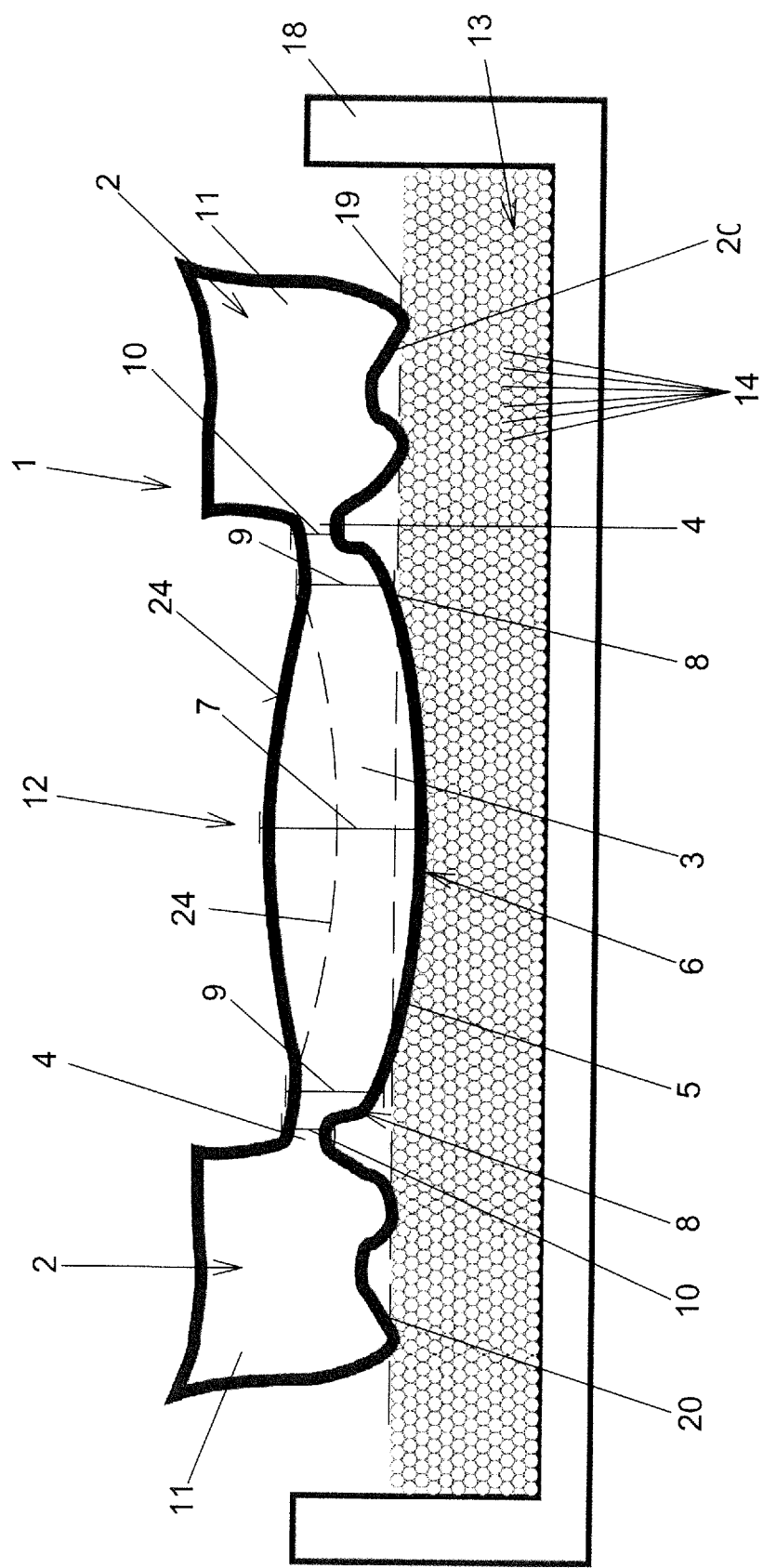
FIG. 3 shows a vertical section through the sintering arrangement according to FIG. 2.

As in other preferred embodiments as well, the sintering blank 1 is embodied as an integral body in this case. The product region 2, the sintering auxiliary body 3 and the connecting webs 4 are formed of the same material in integral fashion. Particularly preferably, such sintering blanks 1 are worked out of a single material block 22. FIG. 3 shows a schematically illustrated vertical section along the cut line AA through the sintering arrangement according to FIG. 2. Here, it is clearly visible that the sintering body 3 in this exemplary embodiment has a convex lens-shaped cross section. The connecting webs 4 merge into the sintering auxiliary body 3 at the regions 8 at the edge of the sintering auxiliary body 3. In the central region 6, the sintering auxiliary body 3 has a greater thickness 7 than in the regions 8 at the edge. A continuous transition that is as round as possible is provided in each case between the sintering auxiliary body 3, the connecting webs 4 and the product region 2 or the respective denture tooth blanks 11, as a result of which stresses during the sintering process can be avoided particularly well. Expediently, the maximum thickness 7 of the sintering auxiliary body 3 is less than or equal to 6 times, preferably less than or equal to 4 times, the minimum thickness 10 of the connecting webs 4. Expediently, all thicknesses 7, 9 and 10 are measured in normal fashion in relation to the occlusion plane 9, which is predetermined by the product region 2 and shown in FIG. 3. Thus, these thicknesses are measured parallel to one another. In FIG. 3, it is also clearly visible that both the product region 2 and the support surface 4 of the sintering auxiliary body 3 lie on the bed 13 in the sintering arrangement according to the invention. As a result of the arched support surface 5, placing the sintering blank 1 onto a more or less plane surface of the bed 13 and carefully pressing it into the latter suffices for an ideal bearing of the sintering blank 1 in the bed 13. As a result of this, there is neither a distortion of the sintering blank 1 nor are there relatively large accumulations of sintering beads 14 between the product region 2 and the sintering auxiliary body 3; this is also expedient for fault-free and distortion-free sintering.

The sintering arrangement shown in an exemplary manner in FIGS. 2 and 3 can be sintered in a conventional sintering furnace in this configuration, as is known per se from the prior art. After the sintering process and cooling of the sintering blank 1 whose sintering has been completed at this point, the connecting webs 4 between the product region 2 and the sintering auxiliary body 3 are severed. The connecting webs 4 are particularly well accessible for this separation process as a result of the arched embodiment of the support surface 5. Remains of the connecting webs 4, which may still be present, can be ground away after the separation of the connecting webs 4 from the respective denture tooth blanks 11 or from the denture teeth that arose therefrom by sintering.

Figure 4:
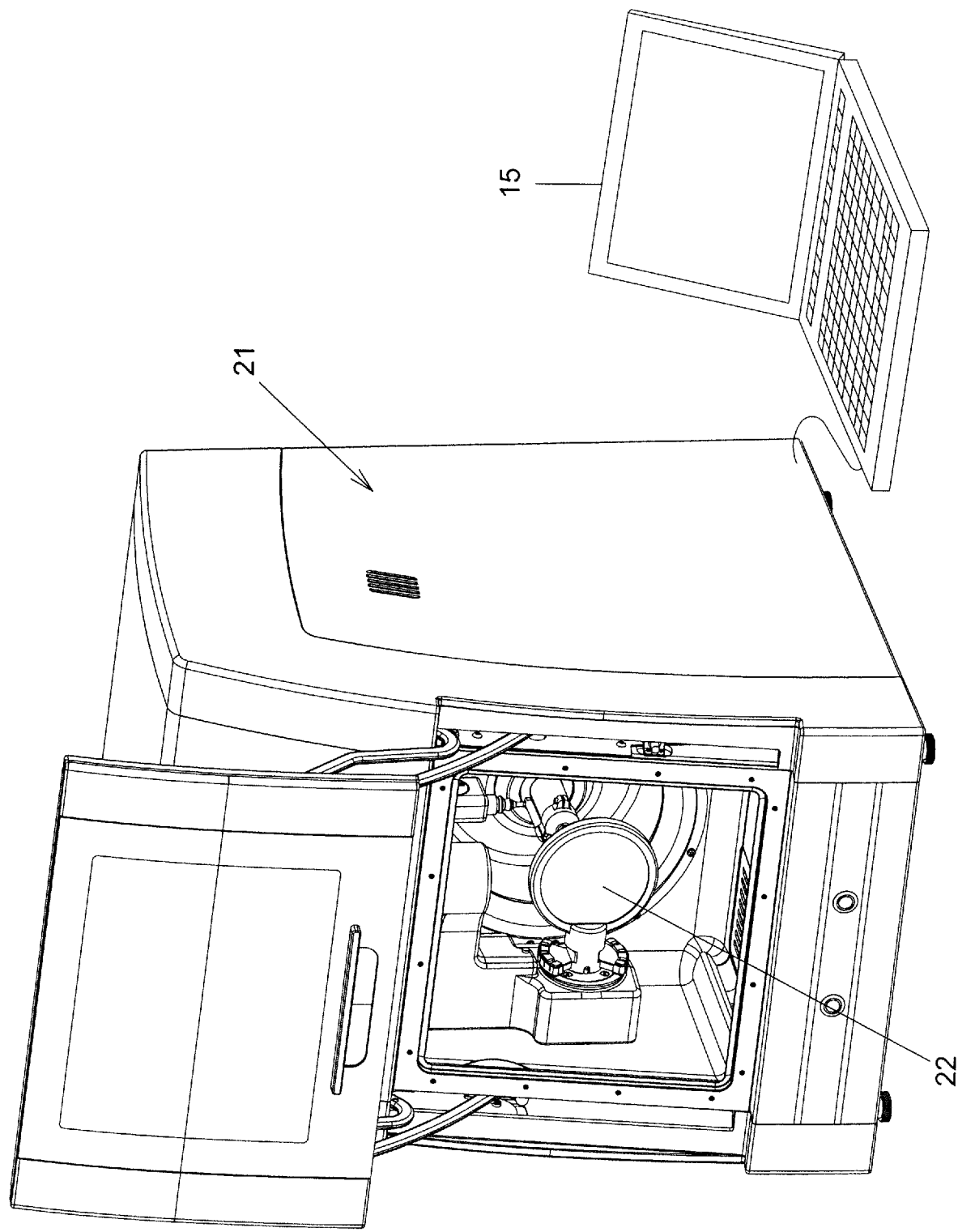
FIGS. 4 and 5 show symbolic representations of production methods according to the invention for the sintering blanks according to the invention.
Figure 5:
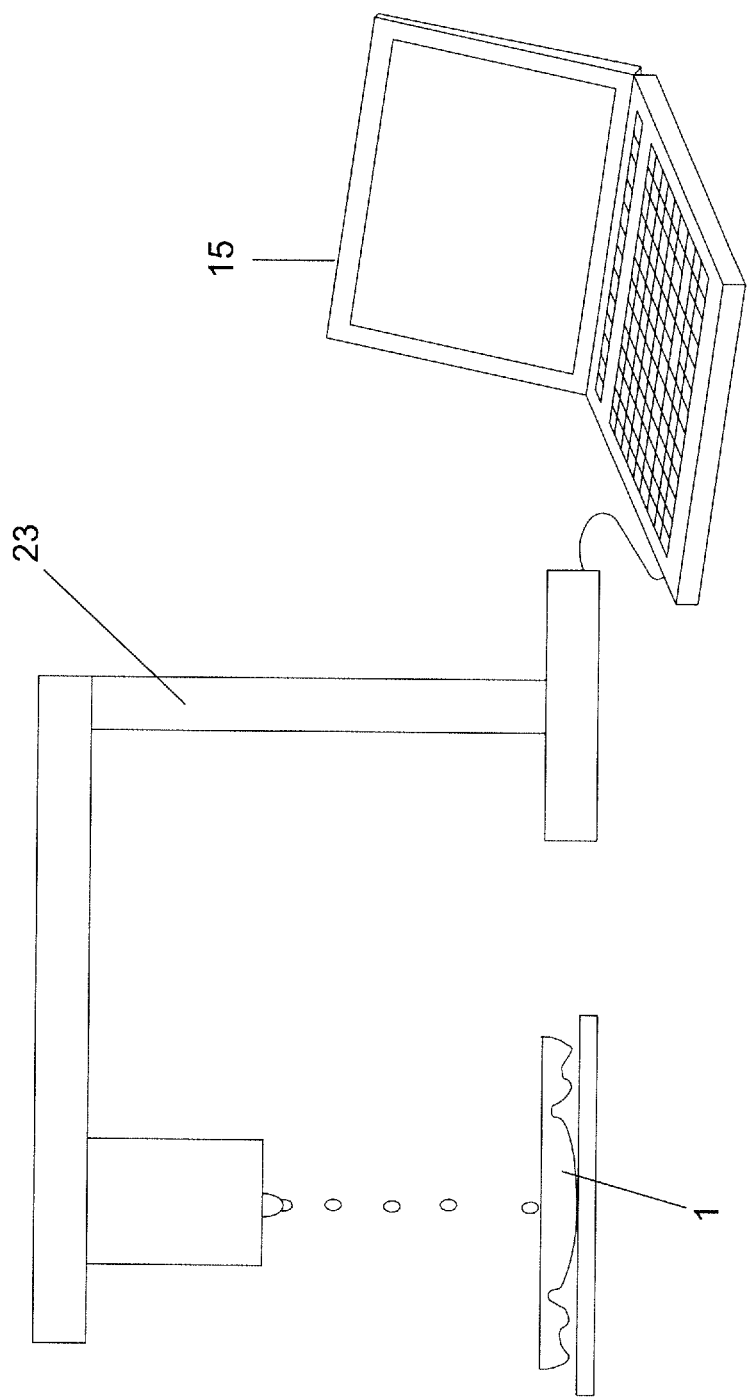

As already explained at the outset, the invention also relates to a computer program for constructing at least one sintering blank 1 according to the invention on a digital computing device 15, as is illustrated in schematic form in FIGS. 4 and 5. The data record produced during the construction of this sintering blank 1 or the data records produced in the process is or are used in the method according to the invention to then produce the sintering blank 1. To this end, use can be made of, for example, material-ablating methods. To this end, FIG. 4 shows, in an exemplary manner, a milling device 21 that is actuated by the computing device 15 using the aforementioned data record, said milling device processing the material block 22 by milling until the sintering blank 1 has been formed. A variant according to the invention having a material-adding method is shown in FIG. 5 in a very schematic and exemplary manner. Here, the computing device 15 actuates a 3-D printer 23, taking account of the corresponding data record or records, such that the sintering blank 1 can be produced thus by a material-adding method. Appropriate milling devices 21 and 3-D printers 23 are likewise known in the prior art as a matter of principle, just like the digital actuation thereof by the computing device 15, and so this need not be discussed in any more detail.

LIST OF REFERENCE SIGNS

1 Sintering blank
2 Product region
3 Sintering auxiliary body
4 Connecting web
5 support surface
6 Central region
7 Thickness
8 Region at the edge
9 Thickness
10 Minimum thickness
11 Denture tooth blank
12 Internal space
13 Bed
14 Carrier bead
15 Computing device
16 Spatial direction
17 Spatial direction
18 Sintering tray
19 Occlusion plane
20 Chewing surface
21 Milling device
22 Material block
23 3-D printer
24 Surface
24' Surface

The invention claimed is:

1. A sintering arrangement comprising: a pourable bed made of at least one of carrier beads or a carrier powder, a sintering blank for producing a dental prosthesis mounted on the bed, the sintering blank including at least one product region from which the dental prosthesis is created, at least one sintering auxiliary body, and connecting webs for bracing the product region, the sintering auxiliary body is connected to the product region by the connecting webs, and the sintering auxiliary body has a support surface that is arched at least in regions, and both the product region and the arched support surface of the sintering auxiliary body are at least partially embedded into the bed.

2. The sintering arrangement as claimed in claim 1, wherein the sintering auxiliary body, at least in a region delimited by the arched support surface has at least one convex cross section.

3. The sintering arrangement as claimed in claim 1, wherein the sintering auxiliary body, at least in a region delimited by the arched support surface has convex cross sections in at least two mutually orthogonal spatial directions.

4. The sintering arrangement as claimed in claim 1, wherein the sintered auxiliary body has a greater thickness in a central region than in regions at an edge thereof.

5. The sintering arrangement as claimed in claim 1, wherein the connecting webs merge into the sintering auxiliary body in regions at an edge of the sintering auxiliary body.

6. The sintering arrangement as claimed in claim 1, wherein the sintering auxiliary body, at least in a region delimited by the arched support surface, has at least one convex lens-shaped cross section.

7. The sintering arrangement as claimed in claim 1, wherein a maximum thickness of the sintering auxiliary body is less than or equal to 6 times a minimum thickness of the connecting webs.

8. The sintering arrangement as claimed in claim 1, wherein the product region is a dental arch with a sequence of a plurality of denture tooth blanks connected to one another, and the sintering auxiliary body connects at least two of the denture tooth blanks of said dental arch to one another by way of one connecting web in each case.

9. The sintering arrangement as claimed in claim 8, wherein the dental arch partly encloses an internal space and at least one of the sintering auxiliary body or the connecting webs are arranged at least in part in the internal space.

10. The sintering arrangement as claimed in claim 1, wherein the sintering blank is formed of a ceramic material.

11. The sintering arrangement as claimed in claim 1, wherein the whole sintering blank is at least one of an integral body or worked out of a single material block.

12. The sintering arrangement as claimed in claim 1, wherein the support surface is arched everywhere.

13. The sintering arrangement as claimed in claim 8, wherein the dental arch is at least one of a U-shaped or complete dental arch.

14. The sintering arrangement as claimed in claim 10, wherein the sintering blank consists of zirconium oxide.

15. The sintering arrangement as claimed in claim 1, wherein the product region and the sintering auxiliary body and the connecting webs are integrally formed of a same material.

16. A sintering method, comprising: providing the sintering arrangement of claim 1, and sintering with both the product region and the arched support surface of the sintering auxiliary body are at least partially embedded into the bed.

* * * * *